US012768619B2

(12) United States Patent
Juenemann

(10) Patent No.: US 12,768,619 B2
(45) Date of Patent: Oct. 20, 2026

(54) RIFLESCOPE OR OTHER OPTICAL DEVICE WITH PIVOTABLE SYSTEM ERECTOR

(71) Applicant: Leupold & Stevens, Inc., Beaverton, OR (US)

(72) Inventor: Todd Juenemann, Beaverton, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 18/899,653

(22) Filed: Sep. 27, 2024

(65) Prior Publication Data

US 2025/0102273 A1 Mar. 27, 2025

Related U.S. Application Data

(60) Provisional application No. 63/585,940, filed on Sep. 27, 2023.

(51) Int. Cl.
*F41G 1/38* (2006.01)
*G02B 23/16* (2006.01)

(52) U.S. Cl.
CPC ............... *F41G 1/38* (2013.01); *G02B 23/16* (2013.01)

(58) Field of Classification Search
CPC .................................. F41G 1/38; G02B 23/16
USPC ............................ 42/120, 122; 359/428, 429
See application file for complete search history.

(56) References Cited

U.S. PATENT DOCUMENTS

| | | | | |
|---|---|---|---|---|
| 11,067,364 | B1 * | 7/2021 | Thomas | G02B 25/001 |
| 2004/0080819 | A1 * | 4/2004 | Regan | G02B 7/24 359/429 |
| 2010/0175298 | A1 * | 7/2010 | Thomas | F41G 1/18 42/122 |
| 2014/0285882 | A1 * | 9/2014 | Gotz | G02B 23/145 359/422 |
| 2015/0247702 | A1 | 9/2015 | Davidson et al. | |
| 2016/0231554 | A1 * | 8/2016 | Tang | G02B 23/14 |
| 2016/0290763 | A1 * | 10/2016 | Tang | F41G 1/38 |
| 2023/0134361 | A1 | 5/2023 | Enzinger | |

OTHER PUBLICATIONS

Rifle Scope Main Tube Measurements and Sizes; Mark Denham; Jul. 9, 2021; https://outdoorsmans.com/blogs/rifle-scopes/rifle-scope-main-tube-measurements-and-sizes (Year: 2021).*

(Continued)

*Primary Examiner* — Joshua E Freeman
(74) *Attorney, Agent, or Firm* — Schwabe, Williamson & Wyatt, P.C.

(57) ABSTRACT

Various embodiments described herein include an adjustment turret coupled to an end of a system erector, the adjustment turret operable to pivot the system erector about a pivot point, a main tube to house the pivotable system erector, the main tube characterized in that it has a main tube mounting diameter of less than thirty five millimeters and an interior of the main tube includes: a cavity section, and an additional section located rearwardly of the cavity section; wherein at least part of the end of the system erector is movable along a path terminating at one end in a cavity of the cavity section, wherein a total length of the path from the one end to another end of the path is greater than an interior diameter of the additional section of the main tube. Other embodiments may be disclosed and/or claimed.

22 Claims, 7 Drawing Sheets

(56) References Cited

OTHER PUBLICATIONS

Leupold & Stevens, Inc., Leupold Adds 7-35X56 Models To Mark 5HD Riflescope Line Blog Post, Retrieved from URL: https://www.leupold.com/blog/post/leupold-adds-7-35x56-models-to-mark-5hdriflescope-line, Dated Jan. 18, 2019, 3 pages.

European Patent Office, International Search Report and Written Opinion of the International Searching Authority in PCT/US2024/048969, mailed Nov.-Dec. 2025, 15 pages.

* cited by examiner

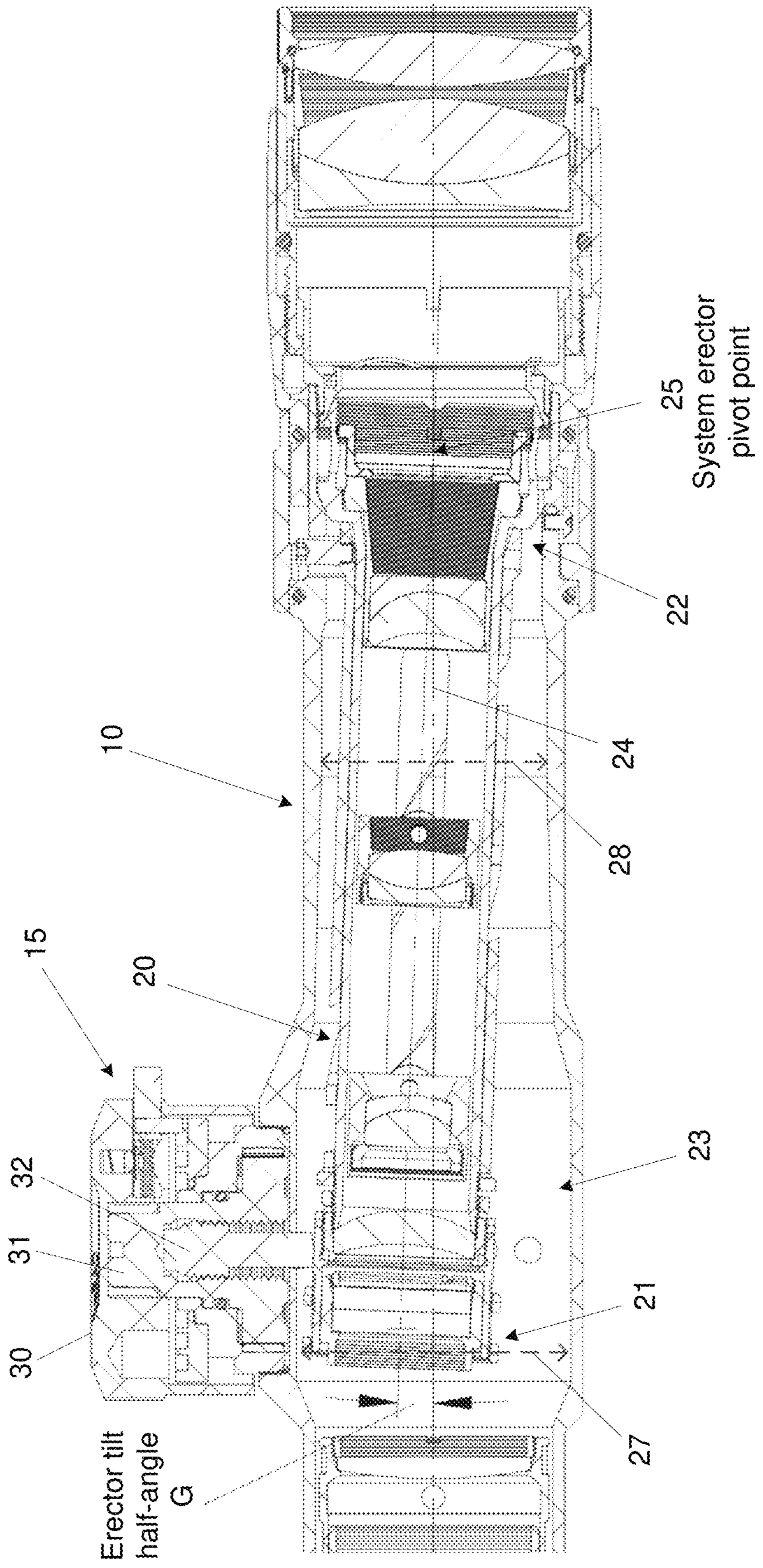
FIG. 1A (background)
100

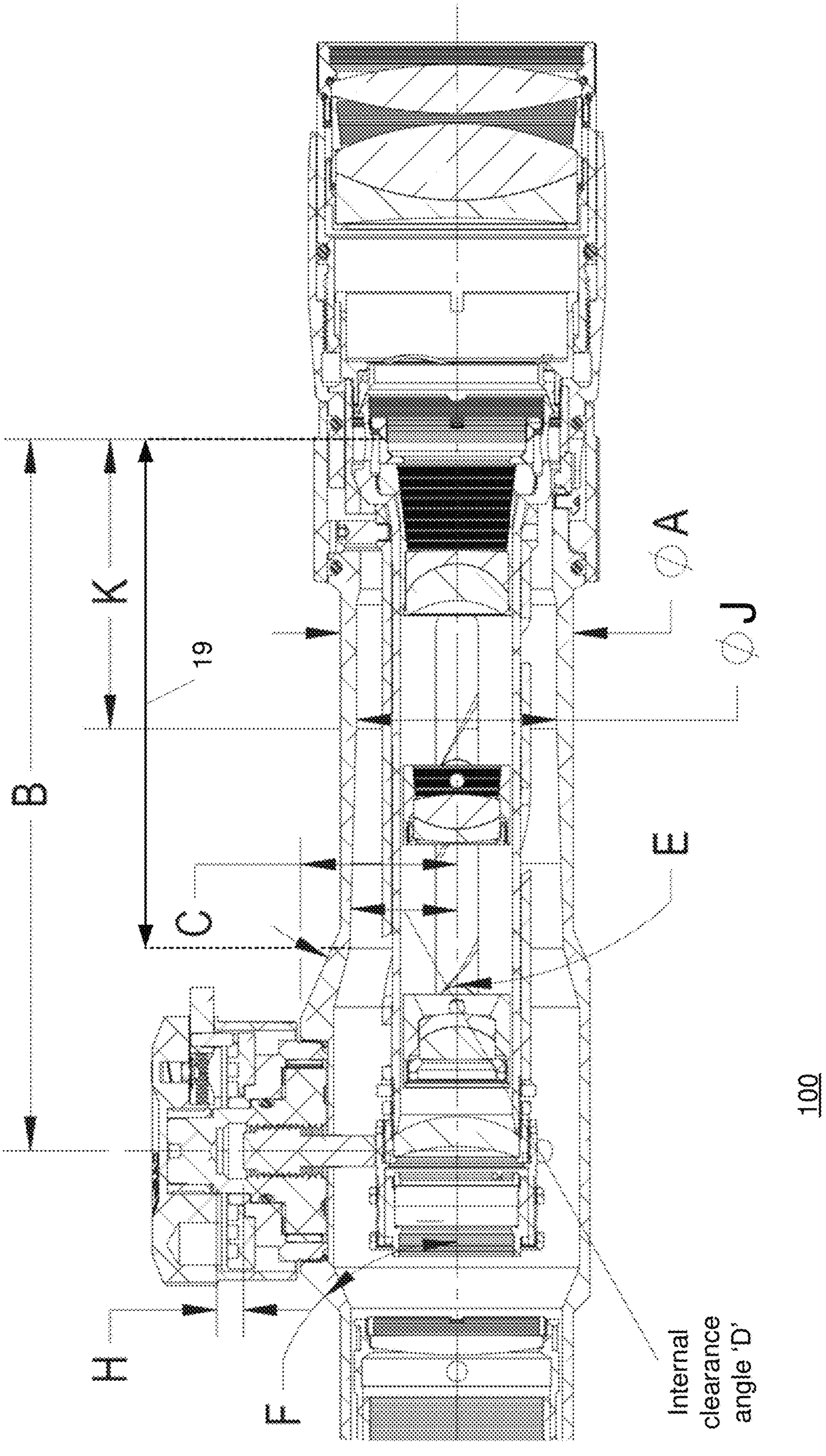
FIG. 1B (background)

FIG. 3A

| 300 | A Maintube Mounting Dia. (mm) | B Distance from Pivot to CL of Adjustment (in) | C Distance from CL to Flat Surfaces of Turret (in) | D Internal Clearance Angle (deg) | E Rear Turret Angle - External (deg) | F Forward Turret Angle - External (deg) | G Erector Tilt 1/2 Angle (deg) |
|---|---|---|---|---|---|---|---|
| Background scope X | 35 | 4.2027 | 0.920 | 1.70 | 24 | 45 | 1.336 |
| Background scope Y | 35 | 4.2027 | 0.920 | 1.70 | 24 | 45 | 2.168 |
| Embodiment P | 30 | 4.2027 | 0.805 | 2.99 | 26 | 40.5 | 0.695 |
| Embodiment Q | 34 | 4.2027 | 0.930 | 1.20 | 29 | 45 | 2.018 |
| Embodiment R | 30 | 4.2443 | 0.715 | 1.12 | 30 | 90 | 1.134 |
| Embodiment S | 34 | 4.2443 | 0.930 | 1.20 | 29 | 45 | 2.039 |

FIG. 3B

| 350 | H Elevation Adjustment Travel Up/Down (in) | J Maintube Internal Diameter (in) | K Distance from Pivot to Start of Internal Clearance Angle (in) | K Distance from Pivot to Start of Internal Clearance Angle (mm) | A/B (in/in) | B/A (in/in) | C/A (in/in) | A/C (in/in) |
|---|---|---|---|---|---|---|---|---|
| BG scope X | 0.098 | 1.188 | 1.710 | 43.434 | 0.3279 | 3.05 | 0.668 | 1.498 |
| BG scope Y | 0.159 | 1.188 | 1.710 | 43.434 | 0.3279 | 3.05 | 0.668 | 1.498 |
| Embodiment P | 0.051 | 1.052 | 2.838 | 72.085 | 0.2810 | 3.56 | 0.682 | 1.467 |
| Embodiment Q | 0.148 | 1.188 | 2.068 | 52.527 | 0.3185 | 3.14 | 0.695 | 1.439 |
| Embodiment R | 0.084 | 1.052 | 2.444 | 62.078 | 0.2783 | 3.59 | 0.605 | 1.652 |
| Embodiment S | 0.151 | 1.188 | 2.109 | 53.569 | 0.3154 | 3.17 | 0.695 | 1.439 |

FIG. 3C

351

| | A/C | J/A | J/B | J/C | C/J | D/A | E/A | F/A | F/E | D/C |
|---|---|---|---|---|---|---|---|---|---|---|
| | (in/in) | (in/in) | (in/in) | (in/in) | (in/in) | (deg/mm) | (deg/mm) | (deg/mm) | (deg/deg) | (deg/in) |
| BG scope X | 1.498 | 0.862 | 0.283 | 1.291 | 0.774 | 0.049 | 0.686 | 1.286 | 1.875 | 1.848 |
| BG scope Y | 1.498 | 0.862 | 0.283 | 1.291 | 0.774 | 0.049 | 0.686 | 1.286 | 1.875 | 1.848 |
| Embodiment P | 1.467 | 0.891 | 0.250 | 1.307 | 0.765 | 0.100 | 0.867 | 1.350 | 1.558 | 3.714 |
| Embodiment Q | 1.439 | 0.888 | 0.283 | 1.277 | 0.783 | 0.035 | 0.853 | 1.324 | 1.552 | 1.290 |
| Embodiment R | 1.652 | 0.891 | 0.248 | 1.471 | 0.680 | 0.037 | 1.000 | 3.000 | 3.000 | 1.566 |
| Embodiment S | 1.439 | 0.888 | 0.280 | 1.277 | 0.783 | 0.035 | 0.853 | 1.324 | 1.552 | 1.290 |

FIG. 3D

352

| | A/(B-K) | (B-K)/J | D/G | (B/A)*D | (B/A)*G | (B/J)*D | (B/J)*G |
|---|---|---|---|---|---|---|---|
| | (mm/in) | (in/in) | (deg/deg) | | | | |
| BG scope X | 14.041 | 2.098 | 1.272 | 5.185 | 4.075 | 6.014 | 4.727 |
| BG scope Y | 14.041 | 2.098 | 0.784 | 5.185 | 6.613 | 6.014 | 7.670 |
| Embodiment P | 21.983 | 1.297 | 4.300 | 10.639 | 2.474 | 11.945 | 2.778 |
| Embodiment Q | 15.927 | 1.797 | 0.595 | 3.768 | 6.336 | 4.245 | 7.139 |
| Embodiment R | 16.664 | 1.711 | 0.988 | 4.025 | 4.075 | 4.519 | 4.575 |
| Embodiment S | 15.923 | 1.797 | 0.589 | 3.805 | 6.465 | 4.287 | 7.284 |

RIFLESCOPE OR OTHER OPTICAL DEVICE WITH PIVOTABLE SYSTEM ERECTOR

RELATED APPLICATION

This application claims priority benefit to U.S. provisional application Ser. No. 63/585,940, filed on Sep. 27, 2023, which is incorporated by reference herein in its entirety.

TECHNICAL FIELD

The field of the present disclosure relates generally to riflescopes or other optical devices, and in particular, to a riflescope or other optical device including a pivotable system erector movable along a path that is longer than a main tube internal diameter.

BACKGROUND

Sighting devices such as riflescopes have long been used in conjunction with weapons and firearms, such as rifles, handguns, and crossbows, to allow a shooter to accurately aim at a selected target. Because bullet and arrow trajectory, wind conditions, and distance to the target can vary depending upon shooting conditions, quality sighting devices typically provide compensation for variations in these conditions by allowing a shooter to make incremental adjustments to the optical characteristics or the aiming of the sighting device relative to the weapon surface on which it is mounted. These adjustments are known as elevation and windage adjustments, and are typically accomplished by lateral movement of an adjusting member, such as a reticle located within the riflescope, as shown in U.S. Pat. No. 3,058,391 of Leupold, or movement of one or more lenses within a housing of the riflescope, as shown in U.S. Pat. Nos. 3,297,389 and 4,408,842 of Gibson, and U.S. Pat. No. 7,827,723 of Zaderey et al.

The shooter typically makes such adjustments using rotatable adjustment knobs to drive movement of the adjustable member of the sighting device. Rotatable knobs may also be used to adjust other features of riflescopes, binoculars, spotting scopes, or other suitable optical devices, such as parallax, focus, illumination brightness, or other suitable features. Although the rotatable knobs are described in relation to use with sighting devices, rotatable knobs may be used to adjust an adjustable portion of other devices, and may include volume control knobs, channel selection knobs, radio station selection knobs, and other suitable knobs.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

FIG. 1A illustrates a cross section of a riflescope having a pivotable system erector movable along a path that is longer than a main tube internal diameter, according to various embodiments, in which the pivotable system erector is at maximum angle of inclination relative to the main tube.

FIG. 1B illustrates a cross section of the riflescope of FIG. 1A, in which the pivotable system erector is at no inclination relative to the main tube.

FIG. 3A illustrates part of a table including values for characteristics A-G for various embodiments described herein.

FIG. 3B illustrates a next part of the table of FIG. 3A, including values for characteristics H-K, and ratio values of various ones of the characteristics A-K.

FIG. 3C illustrates a next part of the table of FIGS. 3A-B, including additional ratio values of various ones of the characteristics A-K.

FIG. 3D illustrates a last part of the table of FIGS. 3A-B, including additional ratio values of various ones of the characteristics A-K.

DETAILED DESCRIPTION

Figure 2A:
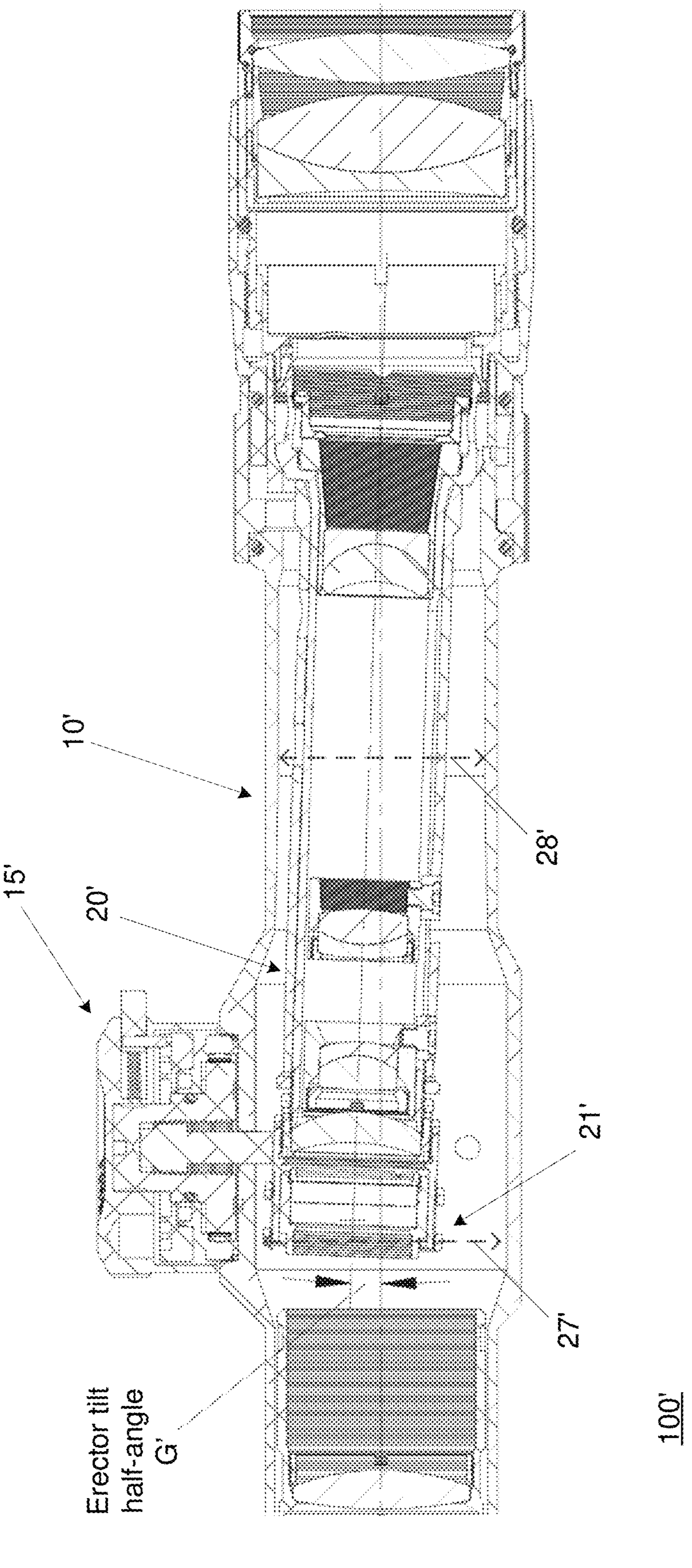
FIG. 2A illustrates a cross section of another riflescope having a pivotable system erector with a range of movement greater than a main tube internal diameter, according to various embodiments, in which the pivotable system erector is at maximum angle of inclination.

With reference to the drawings, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment." "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

FIG. 1A illustrates a cross section of a riflescope 100 having a pivotable system erector 20 movable along a path (indicated by arrow 27), in which said path is longer than a main tube internal diameter (indicated by arrow 28), according to various examples. In FIG. 1A, a pivotable system erector 20 is shown at maximum angle of inclination relative to a main tube 10. FIG. 1B illustrates a cross section of the riflescope 100 of FIG. 1A, in which the pivotable system erector 20 is at no inclination relative to the main tube 10. In this and other illustrations herein, the front end of the riflescope 100 is located on the left and the rear end on the right side.

The riflescope 100 includes the main tube 10 housing the pivotable system erector 20. Each of the main tube 10 and the system erector 20 may house various lenses or other optical elements, as illustrated.

The main tube 10 defines a chamber 23, which may be located under an adjustment assembly 15 (e.g., a turret assembly). An adjustment device 32 (e.g., an adjustment screw) may have an end movable within the chamber 23. This end may be coupled to the first end of the system erector 20, and may drive movement of the system erector 20. The adjustment assembly 15 may include a grippable dial 30 that allows an operator to drive movement of the adjustment device 32 via the adjustment nut 31 (to in turn drive the movement of the first end 21 of the system erector 20). Other examples may use any other adjustment assembly, now known or later developed, capable of driving the described movement of the system erector 20.

The chamber 23 allows a range of movement of the system erector 20 in which a length of the range of movement is greater than a length of the main tube internal diameter (the range of movement, illustrated by dashed arrow 27, is longer than the main tube internal diameter that is indicated by dashed arrow 28). The greater range of movement may be used to provide improved performance (e.g., optical performance, such as longer range) for the riflescope 100 than some other riflescopes of the same main tube internal diameter that do not feature such a chamber (e.g., longer range in some examples).

The chamber 23 may include a first cavity—in the state illustrated in FIG. 1A part of a first end 21 of the system erector 20 is located within the first cavity at the illustrated maximum offset (e.g., maximum inclination) relative to the center line 24 of the main tube 10. The chamber 23 may also include a second cavity to receive the first end 21 of the system erector 20 when the adjustment device 32 is fully extended, which may be referred to herein as maximum declination (in the illustration the adjustment device 32 is in its least extended state).

The dashed arrow 27 shows a length of a path of travel of the first end 21 of the system erector 20. A length of the path of travel indicated by the dashed arrow 27 is longer than the main tube internal diameter indicated by the dashed arrow 28 (e.g., longer than an interior width of the main tube 10, given that the first end 21 of the system erector 20 may travel from the first cavity of the chamber 23) to the second cavity on an opposite interior side of the main tube 10.

Referring now to FIG. 1B, the riflescope 100 may include a set of characteristics A-K (e.g., dimensions, angles, or the like). This set of characteristics A-K may include:

- a main tube mounting diameter A,
- a distance from pivot to center line adjustment B,
- a distance from center line to flat surfaces (e.g., non-sloped surfaces) of turret C,
- an internal clearance angle D,
- a forward turret angle external F,
- an erector tilt half-angle G (FIG. 1A),
- an elevation adjustment travel from a centered position H,
- a main tube internal diameter J, and
- a distance from pivot to start of internal clearance angle K.

In some 35 mm or greater main tube mounting diameter scopes (e.g., riflescope 100 of FIGS. 1A and 1B and/or background scopes X and Y indicated by the table illustrated by FIGS. 3A-D), the values of the set of characteristics A-K may be the values noted in the first two rows of parts 300 and 350 of the table (FIGS. 3A and 3B-background scopes X and Y). Again, this may provide better performance than a riflescope of an equal size main tube that does not feature the pivotable system erector and chamber. FIGS. 1A and 1B also illustrate a distance 19 of where the ramp up of the dial seat starts in relation to the pivot point 25.

Optical Devices Having Main Tube Mounting Diameters of Less than 35 mm

Various embodiments of a riflescope or other optical device may have a more compact profile in various respects, in comparison to background scopes X and Y, by using a smaller main tube mounting diameter (e.g., smaller than 35 mm).

Providing a main tube mounting diameter that is smaller than 35 mm may require adjustment of various ones of the characteristics A-K, to provide satisfactory performance with the compact main tube. This way, comparable or better riflescope performance (e.g., better optical performance, such as better range) can be provided with the smaller main tube. Embodiments P and Q of the table illustrate example values for a 30 mm version and a 34 mm version, respectively.

The example values shown for Embodiments P and Q in the table are only two examples—and the scope of the present disclosure is not limited to these specific values for characteristics A-K. In other examples of a compact riflescope having comparable ranges to Embodiments P and Q, the compact riflescope may have any set of values (e.g., values for characteristics A-K) in which 1) a numerical value of the main tube mounting diameter is less than 35 mm and/or 2) a distance from pivot to start of internal clearance angle (K) is greater than 1.71 inches, and:

- a product of the internal clearance angle and a ratio of distance from pivot to center line of adjustment and main tube mounting diameter (e.g., D*[B/A]) may be a numerical value of five or less, or
- a product of the erector tilt half-angle (G) and the ratio (e.g., G*[B/A]) may be a numerical value of six or less.

For the 34 mm examples (e.g., Embodiments Q and S), the characteristics B and A, using the same units of measurement for both, is approximately 3.14 and 3.17, respectively. The product of this ratio and the internal clearance angle (D) of 1.2 is approximately 3.76 (a value of less than the numerical value of five).

For the 30 mm example (e.g., Embodiments P and R), the characteristics B and A, using the same units of measurement for both, are 106.75 mm and 30 mm, respectively, which provide a value of approximately 3.56 and 3.59, respectively for the ratio B/A. The product of this ratio and the erector tilt angle (G) value of 0.695 is approximately 2.47 (a value of less than the numerical value of six).

In contrast, for Background scopes X and Y, the product using the internal clearance angle (D) and the ratio including the larger main tube diameter value is 5.185, which is greater than the numerical value of five. Also, for the Background scopes X and Y, the product using the erector tilt half-angle and the ratio including the larger main tube diameter value is 6.61, which is greater than the numerical value of six.

Figure 2B:
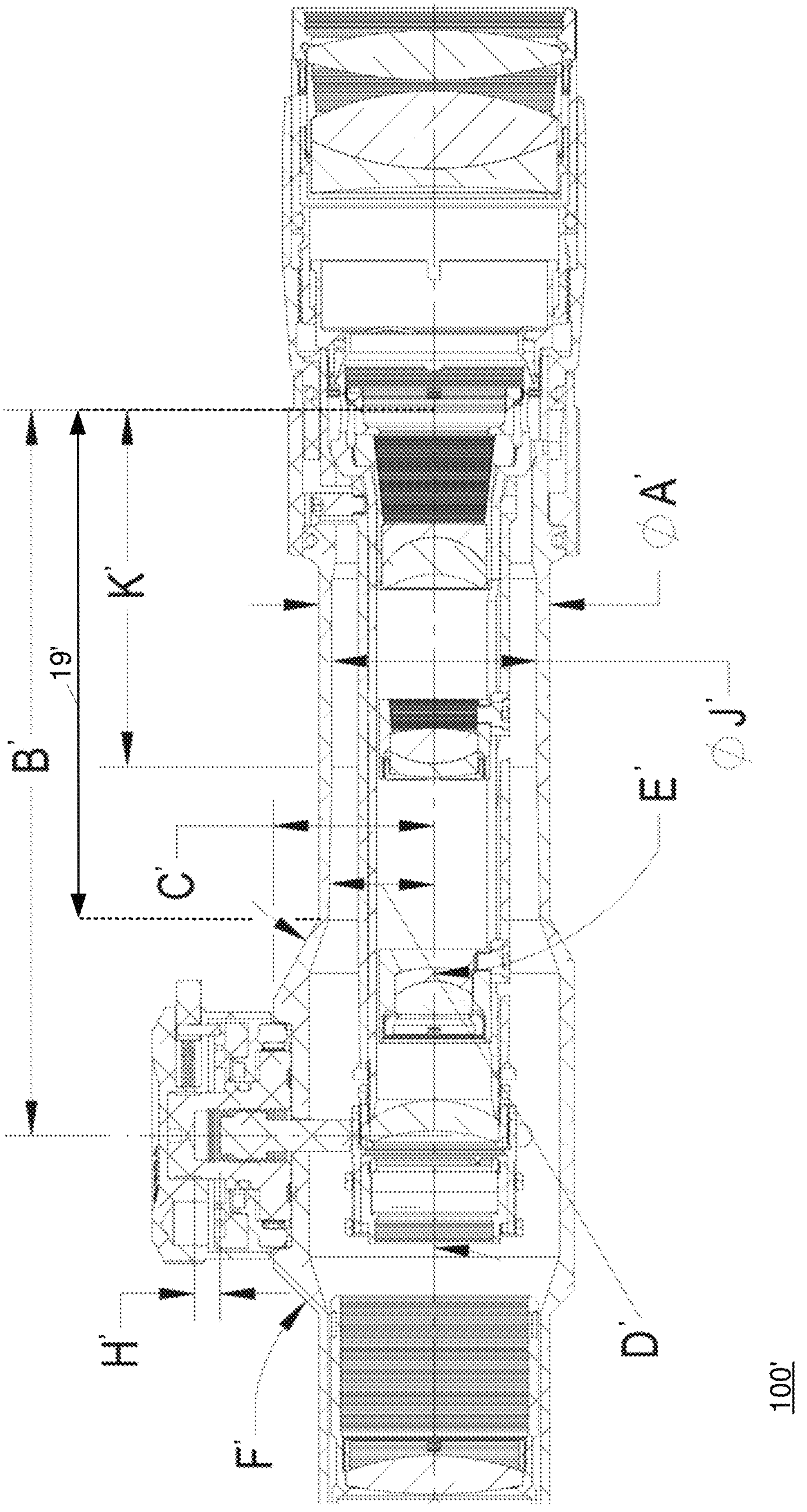
FIG. 2B illustrates a cross section of the riflescope of FIG. 2A, in which the pivotable system erector is at no inclination relative to the main tube.

Referring to FIGS. 2A and 2B, the illustrated riflescope 100' has characteristics A-G corresponding to embodiment Q of the parts 300 and 350 of the table. This riflescope 100' has a main tube 10' than may be similar to main tube 10 in any respect, a pivotable system erector 20' that may be similar to pivotable system erector 20 in any respect, and an adjustment assembly 15' that may be similar to adjustment assembly 15 in any respect.

The first end 21' may make movement similar to the first end 21 in any respect, such as movement along the path indicated by dashed arrow 27' (which may be similar to the movement along the path indicated by dashed arrow 27). The path indicated by dashed arrow 27' may have a length that is greater than the main tube mounting diameter indicated by dashed arrow 28' (which may be similar in any respect to the main tube mounting diameter indicated by dashed arrow 28). The characteristics A'-G' may be similar in any respect to the characteristics A-G, respectively, with actual values corresponding to Embodiment Q of the table.

Figure 2C:
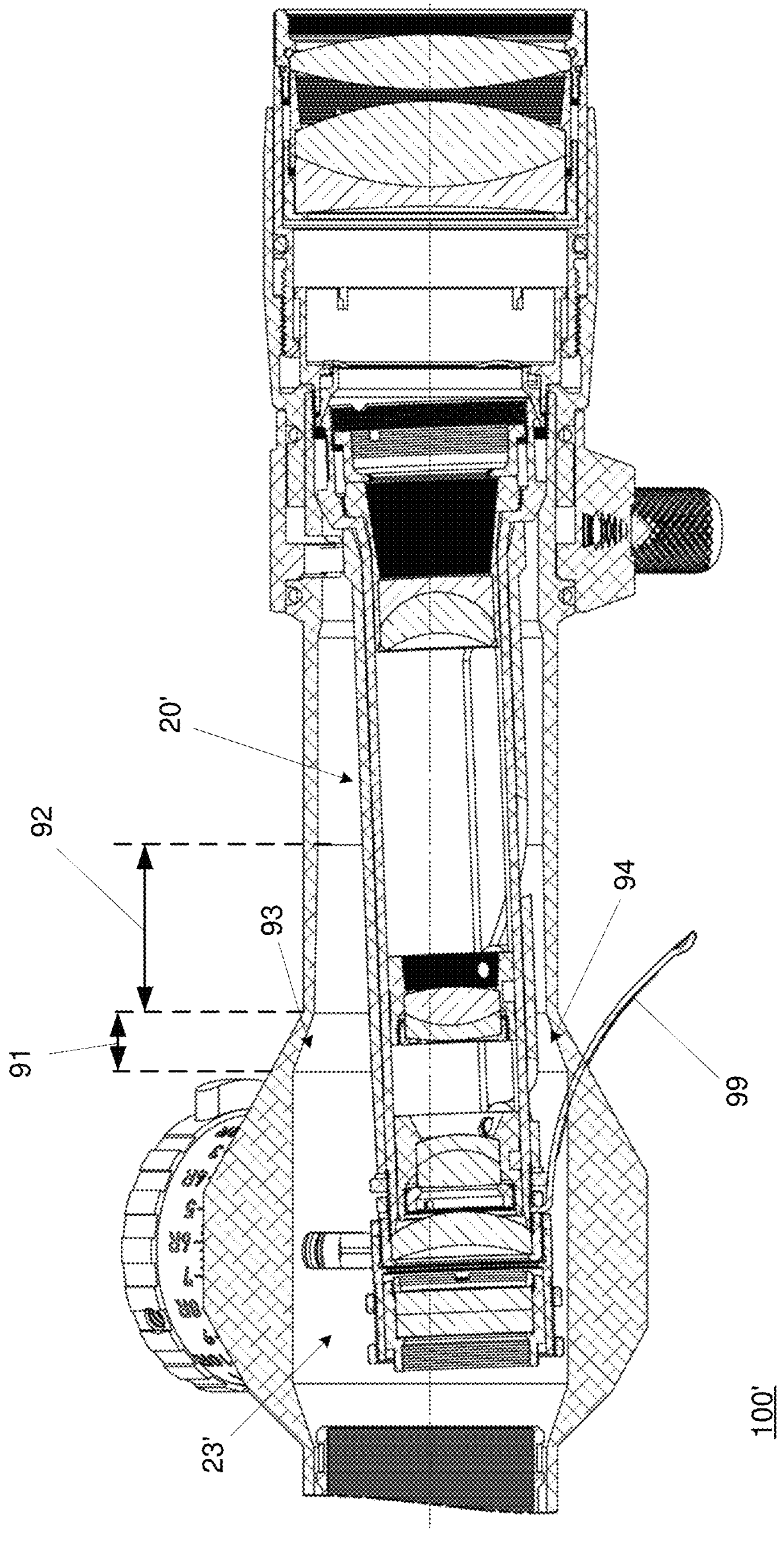
FIG. 2C illustrates another cross section of the riflescope of FIG. 2A, in which the pivotable system erector is at maximum angle of declination.

FIG. 2C illustrates another cross section of the riflescope 100' of FIG. 2A, in which the pivotable system erector 20' is at maximum angle of declination. Whereas FIGS. 2A and 2B illustrate a vertical cross section, FIG. 2C illustrates a cross section taken at forty five degrees from vertical. In this view, an additional component of the pivotable system erector 20', namely a spring 99, is shown. The riflescope 100' is shown in a partially assembled state, so the spring 99 is illustrated in an uncompressed state.

Still referring to FIG. 2C, sections of the main tube interior from a rearmost part of a non-tapered section of the chamber 23' (which may be similar in any respects to chamber 23 of FIG. 1A), moving rearward, the main tube interior includes one of more intermediary sections including a first tapered section 91 and a second differently tapered section 92 (e.g., a more gradually tapering section) located rearwardly of the first tapered section 91. The main tube interior may include an additional section located rearwardly of the one or more intermediary sections. A width of a main tube interior of at least part of the additional section may be a constant width.

In contrast to the constant width part of the additional section of the main tube interior, a main tube interior may have a non-constant width in the first and second tapered sections 91 and 92, which also may be larger than the constant width. This additional width may correspond to top and bottom spaces, such as top space 93 and bottom space 94. When the riflescope 100's is fully assembled, at least a portion of the pivotable system erector 20' (e.g., at least part of the spring 99, in at least a partially collapsed state) may be located in a space coinciding with the additional width in at least one of the tapered sections 91 and 92. For example, when the spring 99 is in a partially collapsed state and the pivotable system erector 20' is at the maximum angle of declination, at least a portion of the pivotable system erector 20' may be located in the bottom space 94 (e.g., at least part of the spring 99 may be located in the bottom space). Therefore, it should be understood that the use of at least one tapered section, such as tapered sections 91 and 92, between the chamber 23' and the part of the additional section that includes the constant interior, may provide space for at least part of the pivotable system erector 20' in the maximum angle of inclination or the maximum angle of declination and/or some amount of range below the maximum angles of inclination/declination.

In the example, the top and bottom spaces 93 and 94 are provided using more than one linear slope for the one or more intermediary sections. However, one of ordinary skill in the art will understand that an intermediary section to provide the top and/or bottom spaces 93 and 94 may have any number of linear and/or non-linear slopes, such a single linear or single non-linear slope, in one example. Also, it may be possible and practical to provide an intermediary section having any width, constant or variable, larger than the constant interior width of the additional section.

One of ordinary skill in the art will also realize that the use of an intermediary section also may not be required, to provide top and bottom spaces for at least a portion of the pivotable system erector 20' in one or more inclinations/declinations. In one example, the chamber may be an elongated chamber that extends to the illustrated constant interior width of the main tube.

A length from a rearmost part of the additional section to a vertical line coinciding with the pivot point has the distance K, indicated in FIG. 2B. A length of the second tapered section is a difference between the distance 19' (FIG. 2B) and the distance K (the distance 19' may be referred to as a longitudinal distance between 1) the pivot point and 2) an intersection of first and second tapering sections). The internal clearance angle D from part 300 of the table corresponds to degree of the taper of the second tapered section. In the first section, a slope of an exterior coincides with the forward turret angle F from part 300 of the table.

Rearward of the first tapered section, a distance from the centerline to an external surface of the turret, rearward of the external surface of the first section (which may be a flat surface, along a plane parallel with the centerline) may be the distance C from part 300 of the table. Further rearward, a downward sloping part of the exterior may have a slope coinciding with the rear turret angle E from part 300 of the table. Further rearward, an end section may have a constant interior width, as illustrated in FIG. 2B.

Additional Optical Devices Having Main Tube Mounting Diameters of Less than 35 mm Various embodiments may include a riflescope similar in any respect to riflescope 200 of FIGS. 2A and 2B, but with numerical values for the characteristics A'-K' indicated for embodiments R and S of parts 300 and 350 of the table.

The numerical values from the table for Embodiments R and S may also be characterized similarly as the second embodiment. The ratios for Embodiments R and S in parts 300 and 350 of the table are 3.59 and 3.17, respectively. The product of the internal clearance angles for Embodiment R and its ratios is less than the numerical value of five.

Alternative Characterizations of any Sub-35 mm Optical Device Described Herein

Ones of Embodiments P, Q, R, and S with the smaller main tube mounting diameter may be alternatively characterized using ranges produced by a ratio of any angle from the parts 300 and 350 of the table over any measurement from those parts 300 and 350 of the table (FIG. 3A and FIG. 3B). Some possible ranges may be numerical ranges of D/A of rows three through six, numerical ranges of E/A for rows three through six, numerical ranges of F/A for rows three through six, numerical ranges of F/E for rows three through six, numerical ranges of D/C for rows three through six, or the like.

In various embodiments, ones of embodiments P, Q, R, and S may be alternatively characterized by a range or a product or quotient of any of the above ratios for a given row and another numerical values from parts 300, 350, 351, and 352 of the table for a given row (FIG. 3A, FIG. 3B, FIG. 3C, and FIG. 3D). In some examples, the Embodiments P, Q, R, and S may be alternatively characterized by product or quotient of that result, and any other one or more numerical values from the given row of the parts 300 and 350 of the table.

In another example, a riflescope having a less than 35 mm main tube mounting diameter may have a dial seat with a shape (such as a conical shape) selected to provide comparable or better riflescope performance than a 35 mm riflescope using a smaller main tube interior diameter. In these examples, a ratio of distance 19' (FIG. 2B) and J may be different than (e.g., greater than or less than) the ratio of distance 19 (FIG. 1B) and J for the Background scopes X and Y, in order to provide comparable or better riflescope performance than a 35 mm riflescope using a smaller main tube interior diameter.

In another example, a riflescope or other optical device, similar to any riflescope or other optical device described herein, in which a ratio of the main tube mounting diameter A from the table divided by the distance from CL to flat surface of turret (C from the table) is not 1.498, e.g.:

- less than 1.498, such as with the values from Embodiments P, Q, S of the table, and/or
- greater than 1.498, such as with the values from Embodiment R of the table.

Examples

The illustrated embodiments describe some examples within the scope of the disclosure of the present application. However, other embodiments within the scope of this disclosure may include any one of the following examples:

Example 1 is a riflescope or other optical device, comprising: a pivotable system erector containing one or more lens or other optical elements; a main tube housing the pivotable system erector; and an adjustment turret coupled to a first end of the system erector, the adjustment turret operable to pivot the system erector about a pivot point corresponding to a second opposite end of the system erector; at least one cavity defined by an interior of the main tube, wherein a distance from a bottom of a cavity of the at least one cavity to a center line of the main tube is greater than a main tube internal radius, and wherein at least part of the first end of the system erector is movable into the cavity of the at least one cavity.

Example 2 includes the subject matter of example 1 and/or any other example herein, wherein a distance from a top of the cavity of the at least one cavity to the center line is not greater than the main tube internal radius.

Example 3 includes the subject matter of any of examples 1-2 and/or any other example herein, wherein the cavity of the at least one cavities comprises a first cavity defined by a first interior side of the main tube, wherein the at least one cavity further includes a second cavity defined by a second interior side of the main tube that is opposite the first interior side of the main tube; wherein a distance from a top of the first cavity to a top of the second cavity is not greater than an interior width of the main tube; and wherein the first end of the system erector is movable into the first cavity or the second cavity.

Example 4 includes the subject matter of any of examples 1-3 and/or any other example herein, wherein the first end of the system erector is movable along a path of travel extending from a location in the first cavity to a location in the second cavity.

It will be obvious to those having skill in the art that many changes may be made to the details of the above-described embodiments without departing from the underlying principles of the invention. The scope of the present invention should, therefore, be determined only by the following claims.

The invention claimed is:

1. A riflescope or another optical device, comprising:

a main tube to house a pivotable system erector, the pivotable system erector containing one or more lenses or other optical elements;

an adjustment turret including an adjustment member, the adjustment member in contact with a first end of the pivotable system erector, the adjustment turret and its adjustment member operable to pivot the pivotable system erector about a pivot point associated with a second opposite end of the pivotable system erector, to move at least part of the first end along a path of movement through an interior of the main tube, the path of movement including at least a first point corresponding to a maximum angle of declination of the pivotable system erector, a second point corresponding to a maximum angle of inclination of the pivotable system erector, and a third point corresponding to no inclination, and no declination, of the pivotable system erector;

the main tube to house the pivotable system erector, characterized in that 1) is has a main tube mounting diameter of less than thirty five millimeters, 2) a total distance from the first point to the second point is not greater than six times a reach of the portion of the adjustment member into the interior of the main tube when the pivotable system erector is coincident with the third point, and 3) an interior of the main tube includes:

a cavity section at least partially defining at least one cavity, and an additional section located rearwardly of the cavity section;

wherein the path of movement terminates at one end in a cavity of the at least one cavity, wherein a distance from the first point to the second point is greater than an interior diameter of the additional section of the main tube.

2. The riflescope or the other optical device of claim 1, wherein the main tube further includes an intermediary section located between the cavity section and the additional section, the intermediary section including a top space or a bottom space wherein at least a portion of the intermediary section has an interior width that is greater than the interior diameter;

wherein when the at least part of the first end of the pivotable system erector is located in the cavity of the at least one cavity, a different part of the pivotable system erector is located in the top space or the bottom space of the intermediary section.

3. The riflescope or the other optical device of claim 1, wherein the main tube includes characteristics comprising an internal clearance angle (D), an erector tilt half-angle (G), and a distance from the pivot point to center line of adjustment (B);

the main tube characterized in that:

a product of the angle D and a ratio of the distance B over the main tube mounting diameter is not greater than a numerical value of five, or a product of the angle G and said ratio is not greater than a numerical value of six.

4. The riflescope or the other optical device of claim 3, wherein the characteristics further comprise a distance from the pivot point to a start of internal clearance angle (K), and wherein the angle K is greater than, or less than, 43.434 millimeters.

5. The riflescope or the other optical device of claim 3, the internal clearance angle defines a slope of the part of the interior associated with the second tapered section, and wherein the angle D is greater than 1.70 degrees.

6. The riflescope or the other optical device of claim 3, the angle D defines a slope of the part of the interior associated with the second tapered section, and wherein the angle D is less than 1.70 degrees.

7. The riflescope or the other optical device of claim 1, wherein a ratio of the main tube mounting diameter over the distance B is less than a numerical value of 0.3278.

8. The riflescope or the other optical device of claim 1, wherein a ratio of the main tube mounting diameter over the distance B is greater than a numerical value of 0.3278.

9. The riflescope or the other optical device of claim 1, wherein the adjustment turret has an exterior flat arranged along a plane parallel with the center line, and wherein a distance from the plane to the center line is not greater than about 0.93 inches.

10. The riflescope or the other optical device of claim 1, wherein an exterior of the adjustment turret includes a sloped exterior section, a part of which is located rearwardly of the first end of the pivotable system erector, the sloped exterior section angled by more than twenty four degrees.

11. A riflescope or another optical device, comprising:

a main tube to house a pivotable system erector, the pivotable system erector containing one or more lenses or other optical elements;

an adjustment turret including an adjustment member, the adjustment member in contact with a first end of the pivotable system erector, the adjustment turret and its adjustment member operable to pivot the pivotable system erector about a pivot point associated with a second opposite end of the pivotable system erector, to move at least part of the first end along a path of movement through an interior of the main tube, the path of movement including at least a first point corresponding to a maximum angle of declination of the pivotable system erector, a second point corresponding to a maximum angle of inclination of the pivotable system erector, and a third point corresponding to no inclination, and no declination, of the pivotable system erector;

a main tube to house the pivotable system erector characterized in that 1) it has a main tube mounting diameter of less than thirty five millimeters, 2) it has a longitudinal center line and a portion of the adjustment member protrudes into the interior more than a quarter of the way to the longitudinal center line, at said no inclination, and no declination, of the pivotable system erector, and 3) An interior of the main tube includes:

a cavity section at least partially defining at least one cavity, at least one intermediary section located rearwardly of the cavity section, and an additional section located rearwardly of the at least one intermediary section;

wherein the path of movement terminates at one end in a cavity of the at least one cavity, wherein a distance from the first point to the second point is greater than an interior diameter of the additional section of the main tube;

the at least one intermediary section defining a top space or a bottom space wherein at least a portion of the intermediary section has an interior width that is greater than the interior diameter of the additional section;

wherein when the at least part of the first end of the pivotable system erector is located in the cavity of the at least one cavity, a different part of the pivotable system erector is located in the top space or the bottom space of the at least one intermediary section.

12. The riflescope or the other optical device of claim 11, wherein the at least one intermediary section comprises a first tapering section and a second differently tapering section located rearwardly of the first tapering section.

13. The riflescope or the other optical device of claim 12, wherein the second differently tapering section includes a more gradual taper than the first tapering section.

14. The riflescope or the other optical device of claim 11, wherein the at least one cavity includes an additional cavity opposite the cavity, wherein another end of the path of movement terminates in the additional cavity.

15. The riflescope or the other optical device of claim 11, wherein a distance from a location of the longitudinal center line of the main tube, exactly underneath a rearmost part of the at least one intermediary section, to the pivot point is greater than 1.710 inches.

16. The riflescope or the other optical device of claim 11, wherein the main tube includes characteristics comprising an internal clearance angle (D), an erector tilt half-angle (G), and a distance from the pivot point to center line of adjustment (B);

the main tube characterized in that:

a product of the angle D and a ratio of the distance B over the main tube mounting diameter is not greater than a numerical value of five, or a product of the angle G and said ratio is not greater than a numerical value of six.

17. The riflescope or the other optical device of claim 16, wherein the characteristics further comprise a distance from the pivot point to start of the internal clearance angle (K), and wherein the distance K is greater than 43.434 millimeters.

18. The riflescope or the other optical device of claim 16, wherein a ratio of the main tube mounting diameter over the distance B is less than a numerical value of 0.3278.

19. The riflescope or the other optical device of claim 16, wherein a ratio of the main tube mounting diameter over the distance B is greater than a numerical value of 0.3278.

20. The riflescope or the other optical device of claim 16, characterized in that the erector tilt half-angle (G) is less than 2.168 degrees.

21. The riflescope or the other optical device of claim 16, wherein an elevation adjustment travel from a centered position of a part of the adjustment turret to a fully raised position of the part of the adjustment turret is less than 0.159 inches.

22. A riflescope or another optical device, comprising:

a main tube with a pivotable system erector, the pivotable system erector containing one or more lenses or other optical elements; and an adjustment turret including an adjustment member, the adjustment member in contact with a first end of the pivotable system erector, the adjustment turret and its adjustment member operable to pivot the pivotable system erector about a pivot point associated with a second opposite end of the pivotable system erector, to move at least part of the first end along a path of movement through an interior of the main tube, the path of movement including at least a first point corresponding to a maximum angle of declination of the pivotable system erector, a second point corresponding to a maximum angle of inclination of the pivotable system erector, and a third point corresponding to no inclination, and no declination, of the pivotable system erector;

the riflescope or other optical device characterized in that:

the portion of the adjustment member protrudes into the interior more than a quarter of the way to the main tube's longitudinal center line, at said no inclination, and no declination, of the pivotable system erector, and an interior of the main tube includes:

a cavity section at least partially defining at least one cavity, and an additional section located rearwardly of the cavity section;

wherein the path of movement terminates at one end in a cavity of the at least one cavity, wherein a distance from the first point to the second point is greater than an interior diameter of the additional section of the main tube; and wherein:

a ratio of a main tube mounting diameter of the main tube divided by a distance from the longitudinal center line of the main tube to a horizontal surface of the adjustment turret (C) is not 1.498, or the main tube mounting diameter is less than thirty five millimeters.

* * * * *